Aug. 28, 1934.    J. E. JIRKA    1,971,983
SAW SETTING MACHINE
Filed Oct. 16, 1933    2 Sheets-Sheet 1
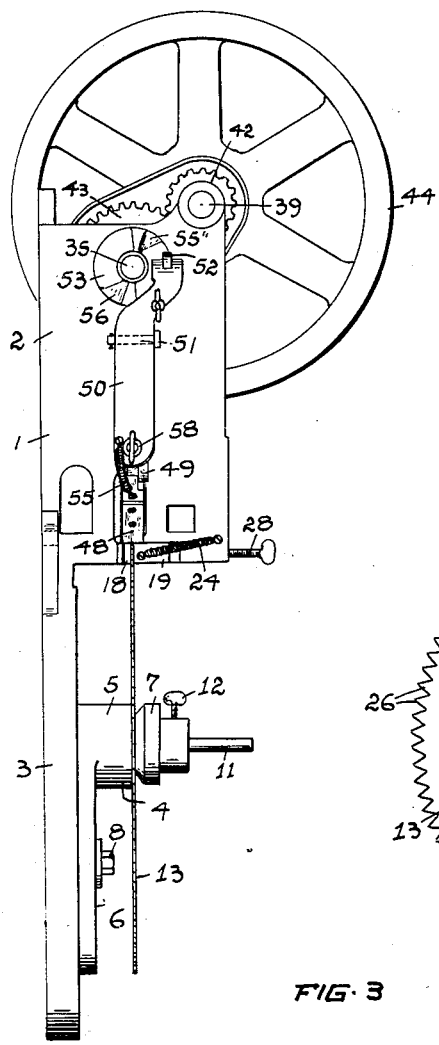
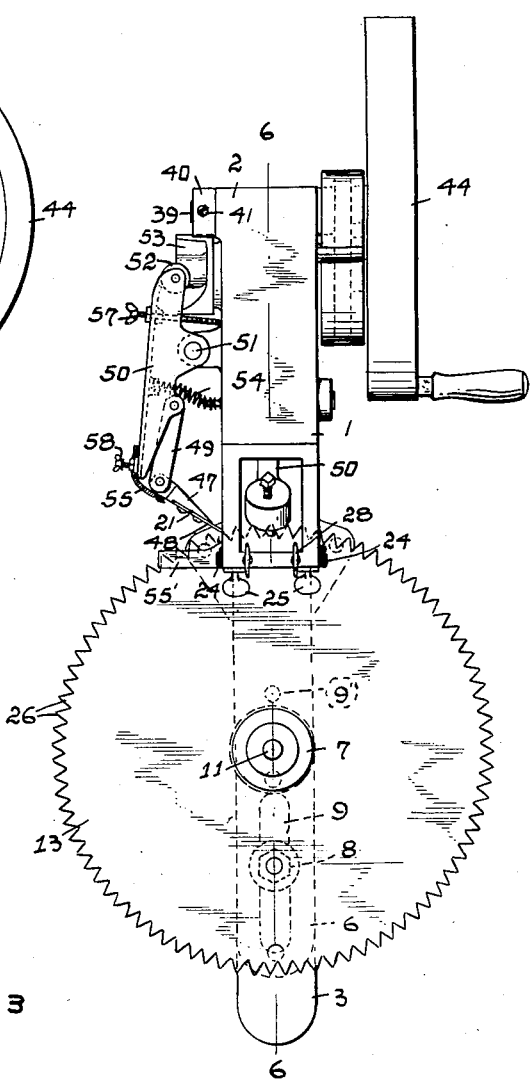
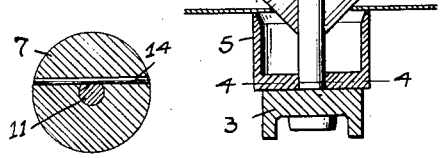
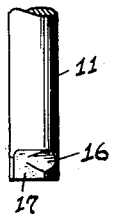

Aug. 28, 1934.  J. E. JIRKA  1,971,983
SAW SETTING MACHINE
Filed Oct. 16, 1933  2 Sheets-Sheet 2

Patented Aug. 28, 1934

1,971,983

UNITED STATES PATENT OFFICE 1,971,983

SAW SETTING MACHINE

James E. Jirka, Cleveland, Ohio

Application October 16, 1933, Serial No. 693,880

1 Claim. (Cl. 76—61)

This invention relates to saw setting machines and more particularly to machines of that type adapted for setting circular saws.

The general object of the invention is to provide a saw setting machine of sturdy economical construction which is automatic and accurate in its action.

A further object of the invention is to provide easily adjustable and efficient frictional saw gripping means which cooperates with the setting means to hold the saw against movement during setting operations.

A still further object of the invention is to utilize the frictional saw gripping means to guide the saw feeding means.

Other objects and advantages of the invention will be apparent as the specification is considered with the accompanying drawings in which:

Figure 1 is a side view of the saw setting machine according to the invention with a circular saw supported therein;

Figure 2 is a plan view of the machine shown in Figure 1;

Figure 3 is an enlarged sectional view through the saw supporting means of the machine, the section being taken on line 3—3 of Figure 1;

Figure 4 is a sectional view on line 4—4 of Figure 3;

Figure 5 is an enlarged fragmentary view of the arbor supporting stem of the saw support;

Figure 6:
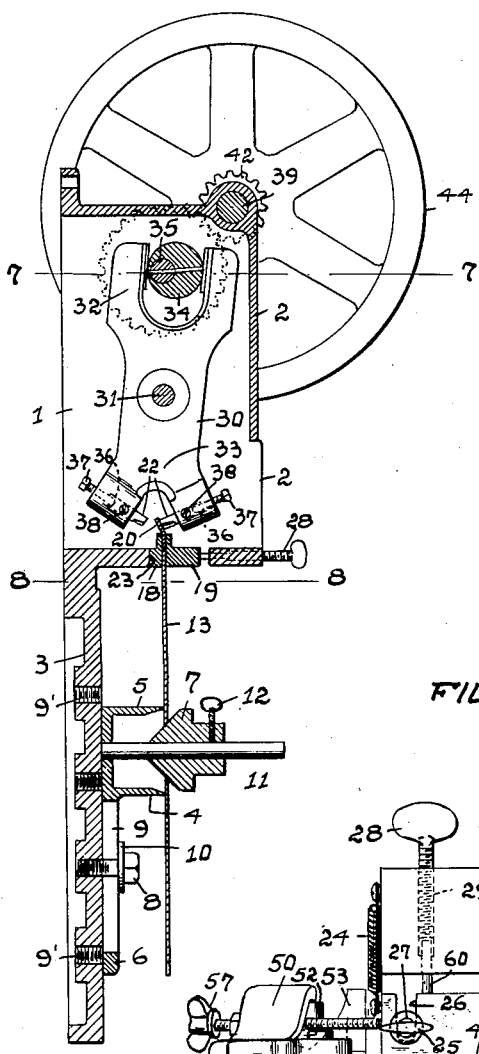
Figure 6 is a longitudinal sectional view through the saw setting machine, the section being taken on line 6—6 of Figure 2.
Figure 7:
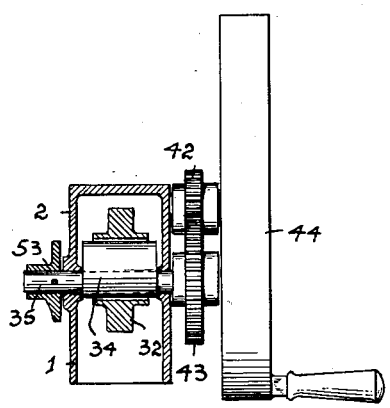
Figure 7 is a cross sectional view on line 7—7 of Figure 6.
Figure 8:
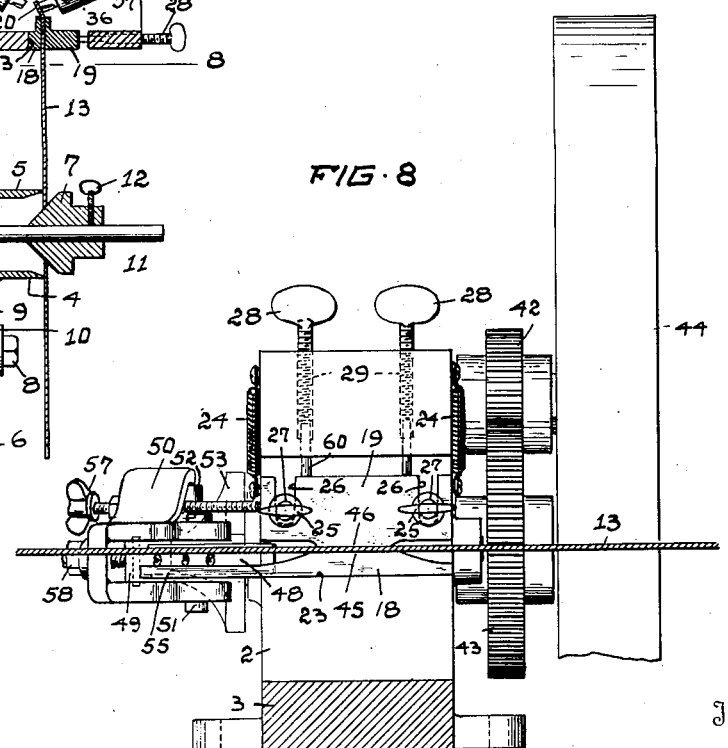
Figure 8 is an enlarged sectional view on line 8—8 of Figure 6 showing the clamping jaw in elevation.

Referring more particularly to the drawings 1 denotes a preferably cast base which may be mounted upon a table, bench or other suitable support. The base 1 comprises a housing 2 from one end of which projects an integral elongated extension 3 to which an arbor support 4 is adjustably clamped. The support 4 is formed with a cupped part 5 having an integral slotted extension 6, the former being adapted to receive a cone-shaped arbor 7, the latter is adapted to be clamped to the base extension 3 by means of headed bolt 8. This bolt extends through slot 9 in extension 6 of support 4 and engages in axially aligned spaced threaded openings 9' in base extension 3, a washer 10 preferably being employed for an obvious purpose. Arbor 7 is centrally apertured to receive a stem 11, to which the arbor is secured in any desired vertical adjustment by means of a set screw 12. The circular saw 13, to be set is clamped frictionally between the top of cupped portion 5 and the lower cone face of arbor 7, the latter being of a size and taper to accommodate saws having holes of say up to 3 inches in diameter. Rotation and withdrawal of the arbor is prevented by a locking pin 14 at the bottom of a central recess 15 in cup 5, which pin cooperates with a groove 16 and shoulder 17 formed on the lower end of stem 11 to lock the arbor in place when the latter is turned to the right. As the arbor can be readily unlocked and removed by merely giving the same a slight turn to the left, the saw can be quickly inserted and taken out.

The toothed peripheral edge of the saw 13 is frictionally gripped and held against movement by means of a fixed jaw or anvil plate 18 and a movable jaw 19, while the saw teeth 20 are being set, however the saw is of course free to be rotated by the oscillating pawl 21 after the setting points or hammers 22 have each acted upon a tooth, in a manner presently described. Anvil plate or jaw 18 is seated upon and suitably secured to a shoulder 23 formed by cutting away the front end of the housing 2, and jaw 19 is suspended from the housing above jaw 18 by a pair of coil springs 24, with freedom for vertical movement. Horizontally disposed thumb screws 25 passing loosely through open slots 26 formed in jaw 19 screwing into threaded openings 27 prevent lateral movement of the jaw while permitting adjustment thereof toward or away from fixed jaw 18. This adjustment is effected by vertically disposed thumb screws 28 mounted in threaded openings 29 in the housing and engaging pins 60 which in turn engage with the movable jaw 19 with their lower ends. When the screws 28 are screwed home the jaw 19 will be forced downwardly towards jaw 18 against the tension of springs 24, until the periphery of the saw 13 is frictionally but rotatably clamped between the jaws, those teeth of the saw lying between the jaws project slightly beyond the rear edge of fixed jaw 18, in position to be acted upon by the setting points 22.

A rock arm 30 pivotally mounted intermediate its length upon a shaft 31, extending laterally through the housing, is formed with inner and outer bifurcated ends 32 and 33 respectively. The end 32 embraces and is actuated by a cam 34 on shaft 35, while the outer end 33 carries the oppositely disposed setter points or hammers 22. These points or hammers, two in number are adjustably mounted in the openings 36 in the respective bifurcations of the outer end of the rock arm. Screws 37 provide means for adjusting the points toward or away from each other and the saw teeth, and set screws 38 lock the points in desired adjusted position.

Cam shaft 35 is driven from a transverse drive shaft 39 mounted in the rear end of the housing and projecting therefrom at opposite ends. A collar 40 fixed to one end of the shaft by a set screw 41 locks the shaft removably in its bearing. Mounted on the other end of shaft 39 is a small gear 42 meshing with a larger gear 43 fixed to one end of cam shaft 35, a balance wheel 44 providing for convenient manual operation.

Upon each revolution of cam shaft 35 one complete oscillation is imparted to rock arm 30, by the action of cam 34, and at the same time one of the setter points 22 is elevated and the other lowered into contact with one of two adjacent saw teeth positioned between the jaws 18 and 19, thus setting one tooth to the right and the other to the left. The jaws 18 and 19 are provided with oppositely disposed enlarged bearing surfaces or portions 45 and 46 respectively against which the saw teeth are pressed by the setter points.

It should be noted that the rock arm swings in a plane extending through the axis of the arbor 7 and that this plane bisects the setter points longitudinally and also bisects the combined gripping and bearing surfaces 45 and 46. This alignment prevents the saw from being rotated by the setter points as would be the case where the parts just described are not directly aligned with each other.

The feed mechanism for rotating the saw tooth by tooth, comprises a pawl 47, having a thin steel outwardly curved or bent blade 48, arranged to engage the teeth successively shortly after the completion of each setting movement of the upper and lower setting points. Thus, pawl 47 is pivotally connected with one end of a link 49, the other end of which is pivotally connected to the front end of a rock arm 50, in turn mounted at one side of the housing on pivot 51. The rear end of rock arm 50, carries a roller 52, held in the path of movement of a double cam 53 on one end of cam shaft 35, by means of an expansion spring 54. A coil spring 55 connected at opposite ends to pawl 47 and rock arm 50 pulls the blade 48 outwardly against the curved inner face of a guide arm or extension 55' integrally formed with the jaw 18, and guides the blade to the saw teeth.

While cam shaft 35 is oscillating rock arm 30 through the medium of eccentric cam 34, the two cam faces 55'' and 56 of double cam 53 alternately engage the roller 52 on rock arm 50 and force the blade 48 of pawl 47 into and out of engagement with the saw teeth. Thus upon each revolution of the cam shaft a tooth is advanced into the path of each of the setter points or hammers by the feed finger 48. The throw of finger 48, to adapt the latter to saws having varyingly spaced teeth, is regulated by means of a thumb screw 57 passing through the outer end of rock arm 50 and bearing against the outer end of link 49, while the throw can be conveniently centered by means of thumb screw 58.

Having thus described my invention, what I claim is:

A saw setting machine, comprising means for rotatably supporting a saw including means for centering circular saws having differently sized central holes, means for frictionally clamping a circular saw close to its toothed periphery, a single oscillatory setting means, oppositely arranged setter points mounted in inclined position at one end of said setting means, and feeding means for advancing said saw after each setting of a single saw tooth by said setting means, said frictional clamping means embodying a rigidly supported clamping jaw, a yieldingly suspended clamping jaw, arranged above said first jaw for parallel movement with respect thereto and means for shifting said yieldingly suspended jaw parallel to and toward said rigidly supported jaw.

JAMES E. JIRKA.